No. 658,867. Patented Oct. 2, 1900.
C. A. ROMANS.
BICYCLE FRAME PUMP.
(Application filed Nov. 2, 1899.)

(No Model.)

WITNESSES
H. A. Lawl
S. W. Atherton

INVENTOR
Charles A. Romans
By A. M. Wooster
Atty.

UNITED STATES PATENT OFFICE.

CHARLES A. ROMANS, OF DANBURY, CONNECTICUT.

BICYCLE-FRAME PUMP.

SPECIFICATION forming part of Letters Patent No. 658,867, dated October 2, 1900.

Application filed November 2, 1899. Serial No. 735,566. (No model.)

*To all whom it may concern:*

Be it known that I, CHARLES A. ROMANS, a citizen of the United States, residing at Danbury, county of Fairfield, State of Connecticut, have invented a new and useful Bicycle-Frame Pump, of which the following is a specification.

My invention relates to the construction of cycles, and has for its object to equip both diamond-frame and drop-frame cycles with pumps which shall be an integral part of the frame, thus providing the rider at all times with a large and easily-operated pump adapted to inflate either a front or rear tire and wholly doing away with the necessity for carrying a pump either in the pocket or tool-bag, it being of course well understood that it is practically impossible for a rider to carry a large-sized pump about with him and that the inflation of a tire with the ordinary tool-bag or pocket pump is not only slow, but exceedingly inconvenient and often painful to persons having tender hands.

In order to accomplish the desired result, I utilize the seat-post tube of either diamond-frame or drop-frame cycles as the cylinder of a pump and provide the piston-rod with a convenient handpiece, which normally lies under the seat and which may be operated to inflate either a front or rear tire without moving the seat or disturbing any adjustment of the cycle.

Figure 1:
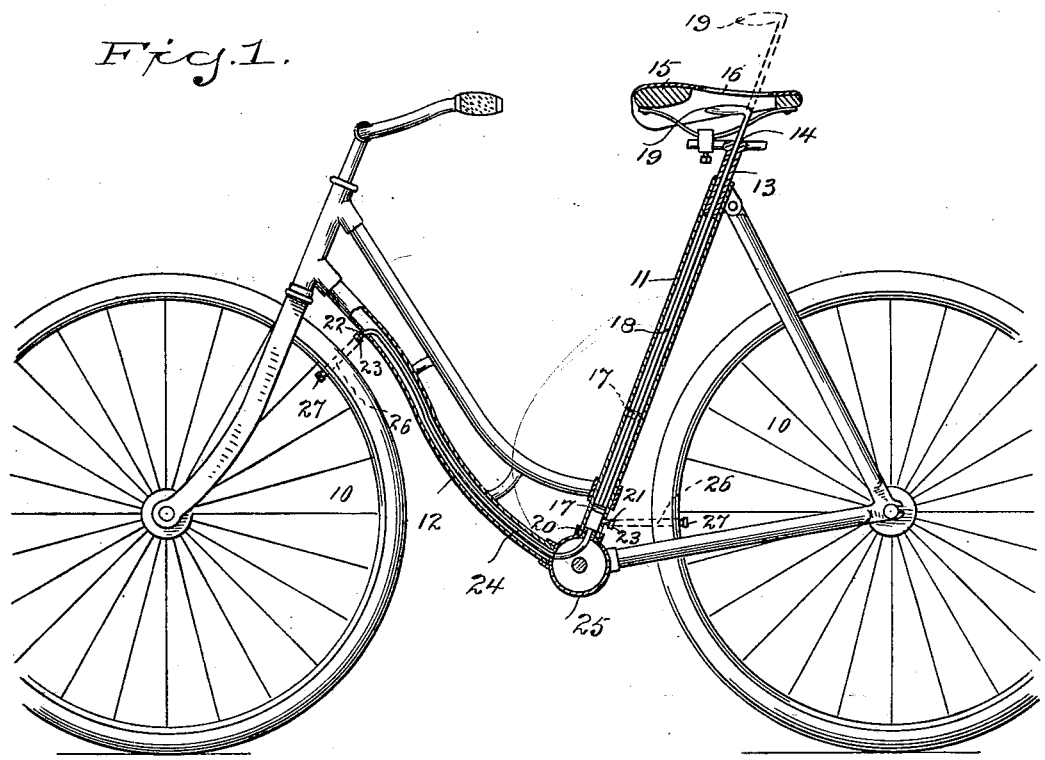
Figure 2:
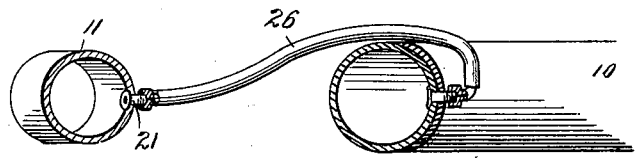

In the accompanying drawings, forming part of this specification, Figure 1 is a view, partly in elevation and partly in section, illustrating the application of my invention to a drop-frame cycle, it being understood that the invention is equally applicable to a diamond frame; and Fig. 2 is a detail view, on an enlarged scale, illustrating a mode of connecting the frame-pump with a tire for the purpose of inflation.

10 denotes a cycle-wheel; 11, a seat-post tube; 12, a lower frame-tube; 13, a seat-post, which is provided with a longitudinal opening 14; and 15, a cycle-seat, shown as provided with a longitudinal opening 16. Within the seat-post tube is a piston 17, whose rod 18 extends through opening 14 in the seat-post and is provided at its upper end with a convenient handpiece 19, which normally lies under the seat, but is adapted to be moved upward through opening 16 in the seat for the purposes of use. The seat-post in practice serves as the plug for the upper end of the seat-post tube, which forms the pump-cylinder, packing (not shown) being of course used about the seat-post, if found necessary or desirable. At the lower end of the seat-post tube is a plug 20, which closes the lower end of the pump-cylinder.

21 denotes a valve at the lower end of the seat-post tube for use in inflating a rear tire, and 22 a valve on the lower frame-tube for use in inflating a front tire. These valves are, when not in use, covered by air-tight caps 23.

24 denotes a tube which extends from valve 22 through the lower frame-tube and through the crank-hanger 25 and passes through or connects with an opening through plug 20.

26 denotes a detachable flexible connection which is adapted to engage either of the valves 21 or 22 and the valves 27 of the tires. This connection requires but very little room and may be conveniently carried in the smallest pocket or bag, or even in a lady's purse, thereby enabling a lady to quickly and conveniently inflate either wheel of a cycle without hard work, without getting into an awkward and uncomfortable position, and without hurting the hands.

The operation is so simple that further explanation can hardly make it clearer. To inflate a tire, the rider removes the cap from the valve of the tire it is desired to inflate and from the corresponding valve on the frame and attaches flexible connection 26 to both valves. The operator then raises handpiece 19 up through opening 16 in the seat, as indicated by dotted lines in Fig. 1, and proceeds to operate the pump in the usual manner. As soon as the tire is inflated the handpiece is pushed down through opening 16, so that it will lie out of the way under the seat, as shown in full lines in Fig. 1, the flexible connection is removed from the valves, and the caps replaced.

Having thus described my invention, I claim—

In a cycle, the combination with the crank-hanger and the lower frame-tube, of the seat-post tube formed as a pump-cylinder and having a plug 20 at its lower end adjacent to the crank-hanger, and the seat-post forming a plug for the upper end of the seat-post tube, said seat-post having a longitudinal opening, a valve 21 in the seat-post tube above and adjacent to the plug 20, a valve 22 in the lower frame-tube, a tube extending from the valve 22 through the lower frame-tube and the crank-hanger to the plug 20, and a piston in the seat-post tube having its rod extending upward through the seat-post and having a handpiece at its upper end.

In testimony whereof I affix my signature in presence of two witnesses.

CHARLES A. ROMANS.

Witnesses:
 WILLIAM MASSEY,
 WALTER VAN HORTRAND.